(12) United States Patent
Wipasuramonton et al.

(10) Patent No.: US 8,662,533 B2
(45) Date of Patent: Mar. 4, 2014

(54) AIRBAG MODULE WITH LIGHT WEIGHT AIRBAG CUSHION

(75) Inventors: Pongdet Paul Wipasuramonton, Rochester, MI (US); Mark Andrew Steinbach, Clawson, MI (US); Neil Alan Teichman, Linden, MI (US); Andrew Jack Pitonyak, Auburn Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 13/463,703

(22) Filed: May 3, 2012

(65) Prior Publication Data
US 2013/0292930 A1 Nov. 7, 2013

(51) Int. Cl.
*B60R 21/231* (2011.01)

(52) U.S. Cl.
USPC ..................... 280/743.1; 280/730.2

(58) Field of Classification Search
USPC .......................... 280/729, 730.2, 743.1, 743.2
See application file for complete search history.

(56) References Cited

U.S. PATENT DOCUMENTS

| | | | |
|---|---|---|---|
| 5,782,489 A | 7/1998 | LaLonde et al. | |
| 6,113,141 A * | 9/2000 | Baker | 280/743.2 |
| 6,220,629 B1 | 4/2001 | Wipasuramonton et al. | |
| 6,355,123 B1 * | 3/2002 | Baker et al. | 156/90 |
| 6,435,553 B1 * | 8/2002 | Wipasuramonton et al. | 280/743.1 |
| 6,550,809 B1 * | 4/2003 | Masuda et al. | 280/743.1 |
| 6,749,220 B1 * | 6/2004 | Wipasuramonton et al. | 280/743.1 |
| 6,886,858 B2 * | 5/2005 | Olson | 280/743.2 |
| 6,971,674 B2 * | 12/2005 | Johansson | 280/743.1 |
| 7,681,917 B2 | 3/2010 | Guillo et al. | |
| 8,240,708 B2 * | 8/2012 | Fink et al. | 280/730.2 |
| 2005/0161928 A1 * | 7/2005 | Teramoto | 280/743.1 |
| 2006/0068140 A1 | 3/2006 | Flather et al. | |
| 2010/0320736 A1 * | 12/2010 | Traber et al. | 280/743.1 |
| 2011/0062689 A1 * | 3/2011 | Fink et al. | 280/730.2 |
| 2011/0181031 A1 * | 7/2011 | Wipasuramonton et al. | 280/743.1 |

FOREIGN PATENT DOCUMENTS

JP 09-226498 A 9/1997

OTHER PUBLICATIONS

Unknown Author, Robotic Arm, Aug. 29, 2010, Wikipedia, http://web.archive.org/web/20100829224612/http://en.wikipedia.org/wiki/Robotic_arm, pp. 1-2.*
International Search Report dated Jul. 8, 2013 issued in connection with International Application No. PCT/US2013/035899.
Written Opinion of the International Searching Authority dated Jul. 8, 2013 issued in connection with International Application No. PCT/US2013/035899.

* cited by examiner

*Primary Examiner* — James English
(74) *Attorney, Agent, or Firm* — Foley & Lardner LLP (57) ABSTRACT

An airbag module including an inflatable airbag cushion having a first panel and a second panel interconnected by a seam, an inflator for inflating the airbag cushion, and a support having a first end and a second end. The first end is coupled to the first panel at a first joint without the use of stitching and the second end is coupled to the second panel at a second joint without the use of stitching. The first and second joints are provided between the seam and an inflatable chamber formed by the first and second panels.

25 Claims, 4 Drawing Sheets

AIRBAG MODULE WITH LIGHT WEIGHT AIRBAG CUSHION

BACKGROUND

The present application relates generally to the field of airbags for use in restraining occupants of vehicles. More specifically, the application relates to airbag modules having light weight airbag cushions.

SUMMARY

An exemplary embodiment relates to an airbag module for use in a vehicle. The airbag module includes an inflatable airbag cushion having a first panel and a second panel interconnected by a seam, an inflator for inflating the airbag cushion, and a support having a first end and a second end. The first end is coupled to the first panel at a first joint without the use of stitching and the second end is coupled to the second panel at a second joint without the use of stitching. The first and second joints are provided between the seam and an inflatable chamber formed by the first and second panels.

Another exemplary embodiment relates to an inflatable airbag cushion for use in an airbag module. The airbag cushion includes at least two panels that includes a first panel and a second panel coupled together at a seam, and a support having a first end and a second end. The first end is coupled to the first panel at a first joint without the use of stitching and the second end is coupled to the second panel at a second joint without the use of stitching. The first and second joints are provided between the seam and an inflatable chamber formed by the first and second panels.

Yet another exemplary embodiment relates to a method for making an airbag cushion including coupling at least two panels including a first panel and a second panel together at a seam, placing a support having a first end and a second end at a location between the first and second panels, coupling the first end of the support to the first panel at a first joint without the use of stitching, and coupling the second end of the support to the second panel at a second joint without the use of stitching. The first and second joints are provided between the seam and an inflatable chamber formed by the first and second panels.

DETAILED DESCRIPTION

With general reference to the Figures, disclosed herein are airbag modules for use in restraining occupant of vehicles. The airbag modules include an inflatable airbag cushion having one or more interconnected panels and a support coupled to the one or more panels to increase the strength of the airbag cushion local to the support. The support may be disposed between the panels and near (or proximate) to a high stress region and/or a reduced strength section, such as a seam, in order to protect the high stress region/reduced strength section from loading by absorbing loads that otherwise would pass directly to the section/region be protected. The airbag cushion having the support may advantageously allow the overall weight of the airbag cushion (and module) to be reduced by allowing relatively lower weight panels of the cushion that are configured to manage a first (e.g., lower) threshold loading condition and by having the support together with the cushion manage a second (e.g., higher) threshold loading condition.

Airbag modules or systems (e.g., side-impact, front-impact) are located in vehicles to restrain occupants (e.g., driver, passenger) during a dynamic vehicle event (e.g., a front-impact, a side-impact, a rollover event, etc.) in order to reduce the likelihood of injury sustained by the occupant during such events. An airbag system typically includes an inflatable airbag cushion that deploys from a stored configuration, during a dynamic vehicle event, and inflates from gas which is rapidly pushed into the airbag cushion by means of an inflator or other inflation (e.g., gas generating) device. The inflated airbag cushion may restrain the occupant or a portion (e.g., torso, head, neck, knees) of the occupant to reduce the displacement (e.g., movement) of the occupant during the dynamic vehicle event and to reduce the likelihood of impact between the occupant and other vehicle components (e.g., doors, dashboards, steering wheels). The inflator may use a device, such as a pyrotechnic device or other airbag inflation device, to generate gas almost instantaneously and to push the gas at a high volumetric flow rate into the inflatable airbag cushion of the airbag system to enable the airbag cushion to deploy or inflate over a very short period of time.

An airbag cushion or airbag may be stored within and deployed from almost anywhere in the vehicle. For example, airbag cushions are stored within and deployed from the inside or outside facing side-surfaces of the seat-back of a seat assembly, from within the dashboard or from the steering column of the vehicle, or from a roof-rail of the vehicle. Airbag cushions are typically packaged for storage through a process involving folding, rolling, or a combination thereof to compact the airbag in order for it to fit into the small storage volume (e.g., a portion of the seat back of a seat system) containing the stored airbag cushion. Airbag modules may be used to provide restraint to any occupant located in any seating row (e.g., first, second, third, etc.) or any seat configuration (e.g., bucket seat, bench seat, etc.) of any vehicle.

A head-side airbag (HSAB) is configured to reduce the likelihood of injury to one or more occupants during a vehicle event that triggers deployment of the HSAB. The HSAB reduces the likelihood of occupant injury by restraining the occupant to avoid the occupant from direct impact with other vehicle components, such as the door assembly or pillar assembly, and by reducing the impact forces on the occupant. HSABs are typically configured to provide restraint to outboard positioned vehicle occupants, such as those adjacent to door assemblies. A single head-side airbag cushion may be configured to provide restraint to more than one vehicle occupant. For example, a HSAB module may include a HSAB cushion configured with one inflatable chamber that provides restraint to more than one vehicle occupant, or may include a HSAB cushion configured with more than one inflatable chamber, whereby different chambers may provide restraint to different vehicle occupants.

A HSAB module is generally stored within the roof-rail (i.e., the portion of the vehicle provided between the top of the door frame and the roof member or assembly) of the vehicle, such that the airbag cushion deploys from the roof-rail, generally in a downward direction along the inside of the door assembly. HSAB cushions are typically manipulated into a stored configuration through a process of folding, rolling, or a combination thereof to compact the airbag cushion in order for the airbag cushion to fit into the small volume (and small cross-section) of the vehicle roof rail and to aid installation of the airbag module into the vehicle. After vehicle installation, the airbag module may be covered, such as by a roof-liner or head-liner, to provide improved interior vehicle aesthetics. The airbag cushion may be configured to breach the roof-liner (or head-liner) during deployment, such that the airbag cushion inflates without impediment or delay.

FIGS. 1-4 illustrate an exemplary embodiment of a HSAB cushion 3 for use in a head-side airbag module 2. The HSAB cushion 3 includes at least one panel that defines at least one inflatable chamber or portion. As shown, the HSAB cushion 3 includes a first panel 31 (e.g., an inner panel) and a second panel 32 (e.g., an outer panel) that may be coupled together to form the one or more inflatable chambers of the HSAB cushion 3. Each panel (e.g., first panel 31, second panel 32) may be made from any suitable material, such as a woven nylon fabric or a polyester fabric.

Figure 3:
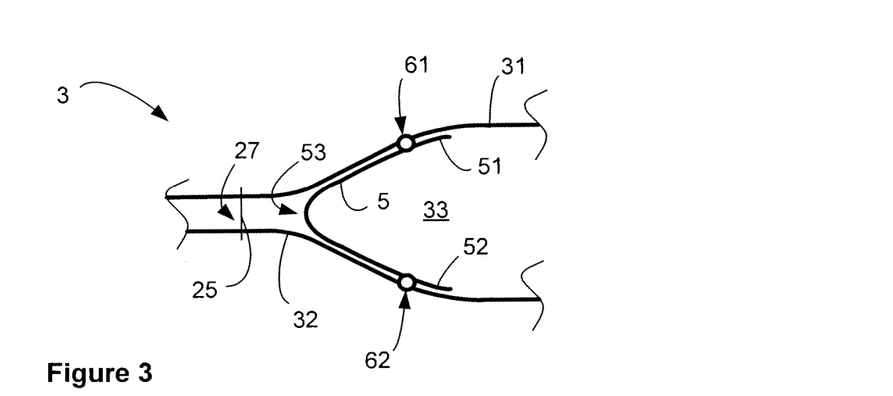
FIG. 3 is a cross-sectional view showing a support located between two panels of the airbag cushion of FIG. 1, shown prior to deployment.
Figure 4:
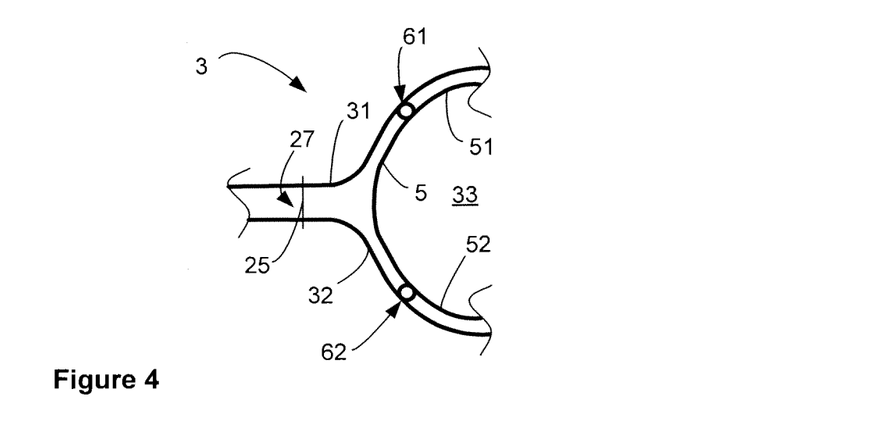
FIG. 4 is the cross-sectional view of FIG. 3, shown during deployment.

The first panel 31 may be interconnected to the second panel 32 at a seam, such as seam 27, through any suitable process or method. As shown in FIGS. 3 and 4, the first panel 31 is connected to the second panel 32 at the seam 27 through sewing a stitch 25 between the panels that defines the seam 27. The seam 27 may be structural (i.e., configured to withstand the forces induced during deployment). However, the stitch 25 generally reduces the strength of the panels 31, 32 local to the position or location of the seam 27, due in part to the plurality of holes provided in the panels 31, 32 during the sewing process. It has been found that strength of the panel (and airbag accordingly) local to the seam 27 can be reduced by as much as 60% (sixty percent) relative to the overall strength of the panel prior to sewing the stitch 25. Further, the configuration of the airbag cushion, such as its shape during deployment, may induce high stress regions (i.e., stress risers). For example, an airbag cushion having convex corners may have higher stress in the convex corner portions relative to other portions of the cushion. One way of managing the high stresses and reduced strength portions of the airbag cushion is to increase the strength of the entire airbag cushion, such as by increasing the thickness (e.g., the denier) of the panels of the airbag cushion. However, this arrangement provides a relatively high weight (e.g., mass) airbag cushion, since those portions of the cushion that are configured without strength reducing features (e.g., stitched seams) and/or without stress risers are configured stronger than needed to accommodate those portions that are configured with strength reducing features and/or stress risers. In other words, the airbag cushion is over designed relative to strength and weight.

Figure 6:
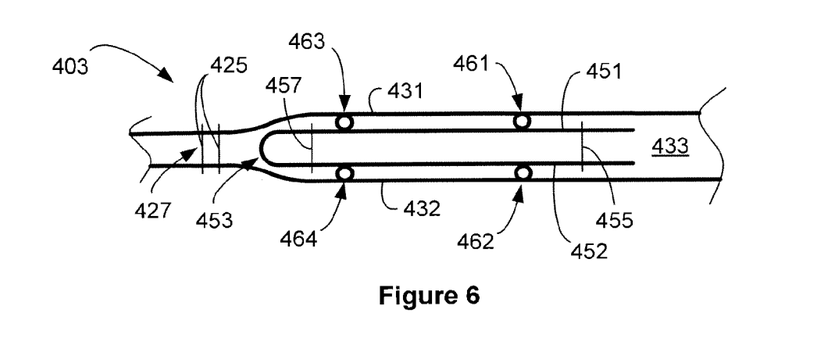
FIG. 6 is a cross-sectional view of another exemplary embodiment of an airbag cushion having a support coupled thereto.

FIG. 6 illustrates another exemplary embodiment of an airbag cushion 403 having a first panel 431 interconnected to a second panel 432 at a seam 427 using a stitch 425. As shown, the seam 427 is formed by having a pair of parallel stitches 425, where each stitch 425 couples the panels 431, 432 together. It is noted that the seams (e.g., seam 27, seam 427) disclosed herein may include any number stitches 425, and those embodiments disclosed herein are examples and are not limiting.

Figure 9:
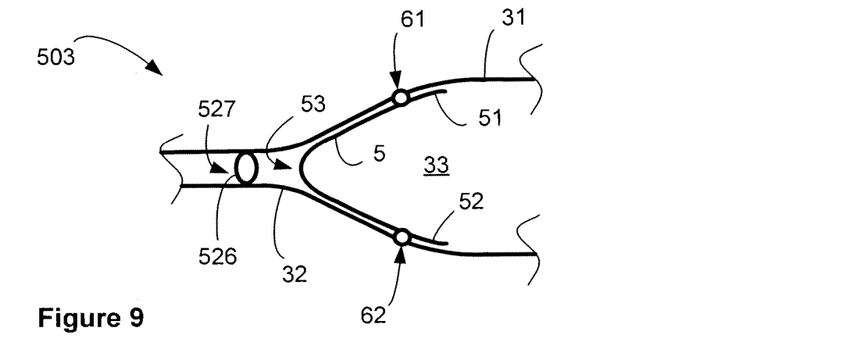
FIG. 9 is a cross-sectional view of another exemplary embodiment of an airbag cushion having a support coupled thereto, shown prior to deployment.
Figure 10:
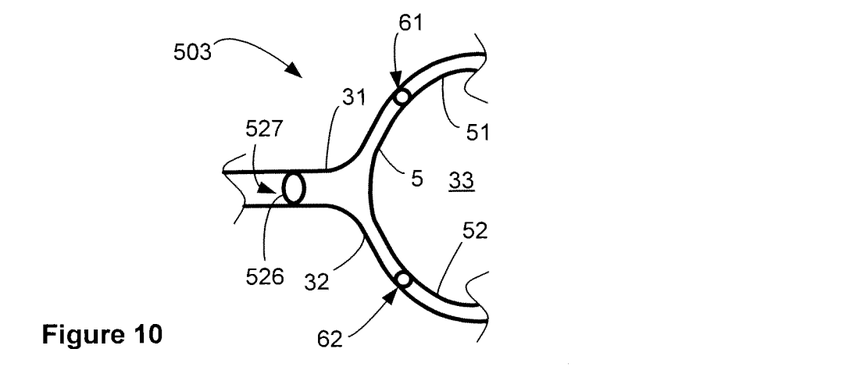
FIG. 10 is the cross-sectional view of FIG. 9, shown during deployment.

As shown in FIGS. 9 and 10, the airbag cushion 503 includes a first panel 31 interconnected with a second panel 32 at the seam 527 through a sealant 526 (e.g., adhesive). The sealant 526 may be applied in any suitable manner, such as, for example, applied between the panels 31, 32. In other words, the sealant 526 may be used to couple an inner surface of the first panel 31 to an inner surface of the second panel 32. The sealant 526 may have a strength that is less than the strength of the fabric forming the panels 31, 32. Accordingly, a support 5 may be provided (e.g., coupled to the panels 31, 32 at respective first and second joints 61, 62) to protect the seam 527 and sealant 526 forming the seam 527. In other words, the support 5 may be provided to shield the sealant 526 of the seam 527 from loading during airbag deployment.

Figure 11:
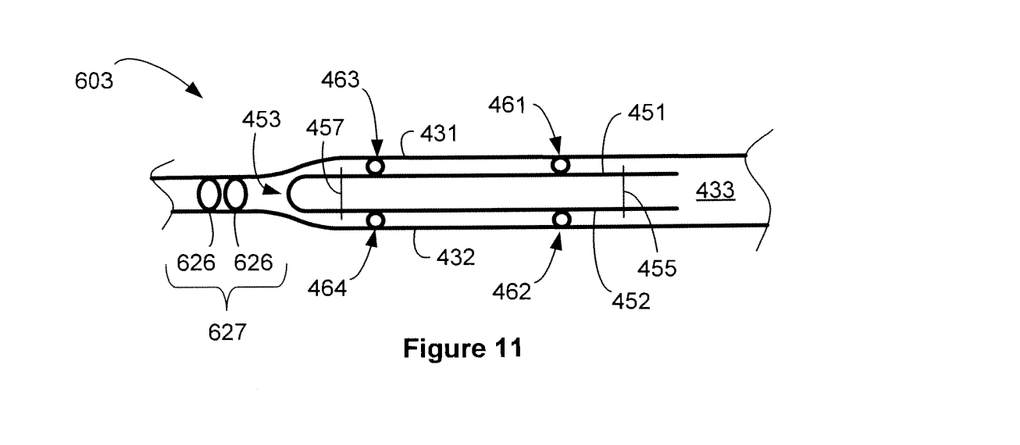
FIG. 11 is a cross-sectional view of yet another exemplary embodiment of an airbag cushion having a support coupled thereto.

FIG. 11 illustrates another exemplary embodiment of an airbag cushion 603 having a first panel 431 interconnected to a second panel 432 at a seam 627 using a sealant 626. As shown, the seam 627 includes two adjacent beads or strips of sealant 626, where each sealant 626 is configured to couple an inner surface of the first panel 431 to an opposing inner surface of the second panel 432. It is noted that the seams (e.g., seam 527, seam 627) disclosed herein may include any number sealants 526, 626, and those embodiments disclosed herein are examples and are not limiting. It is also noted that the seams (e.g., seam 27, seam 427, seam 527, seam 627, etc.) may be configured including at least one stitch and at least one sealant. For example, the seam may be configured with a stitch and a sealant with the sealant provided between the stitch and the support.

Figure 1:
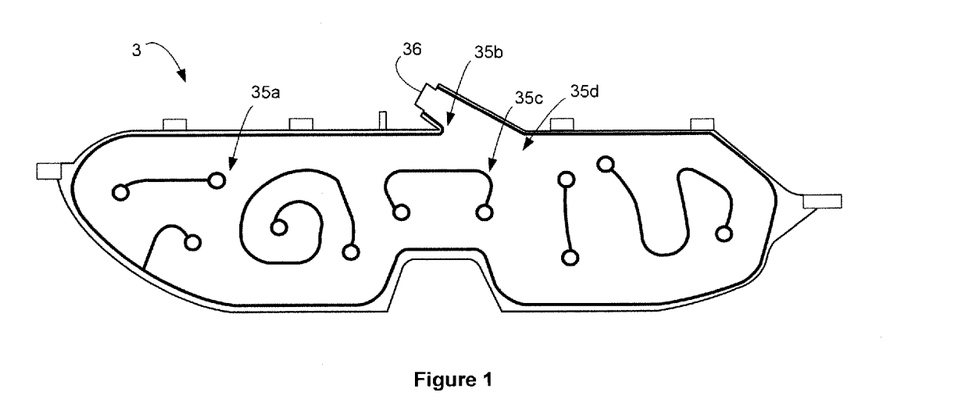
FIG. 1 is a side view of an exemplary embodiment of an airbag cushion for use in a head-side airbag module.

As shown in FIG. 1, the airbag cushion includes a plurality of high stress locations 35 (e.g., high stress regions, areas, etc.). The plurality of high stress locations 35 may correspond to locations where the strength of the airbag cushion 3 has been reduced, such as through a stitch, to locations that experience high loading or pressures, such as from inflation gas during airbag deployment, or to any suitable location induced to have relatively high stresses.

The airbag cushions as disclosed herein are configured to include one or more than one support configured to increase the strength of the airbag cushion in the specific area(s) where the support(s) is/are provided. For example, the support(s) may be coupled to the airbag cushion in the high stress and/or reduced strength areas to compensate for the higher loading/ reduced strength, such that the airbag cushion is optimally designed with each relative portion of the airbag cushion having a strength tailored to the relative stress/loading of that portion, so that the cushion is not overdesigned in certain portions. This arrangement may advantageously allow the airbag cushion to have a relatively low weight/mass compared to airbag cushions having thicker panels designed to accommodate the reduction in strength.

Figure 2:
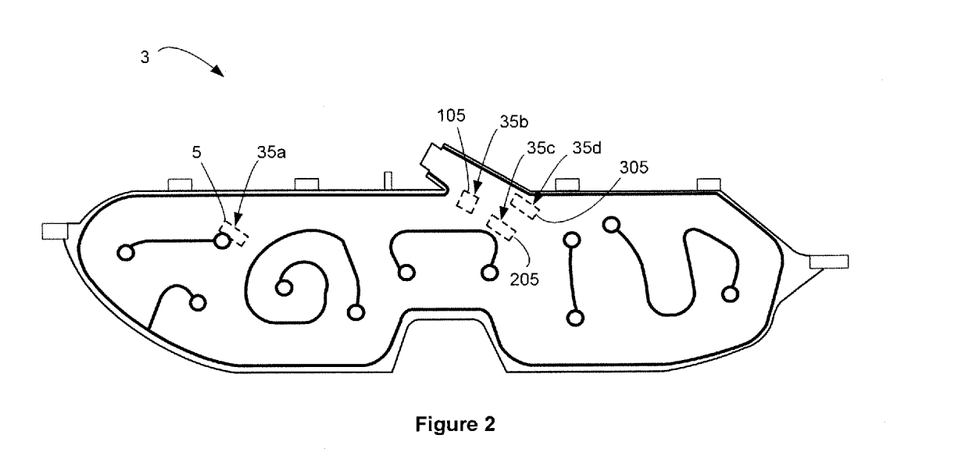
FIG. 2 is a side view the head-side airbag cushion of FIG. 1 having a plurality of supports coupled thereto.

As shown in FIG. 2, the HSAB cushion 3 includes a support 5 that is configured in a forward portion 34 of the cushion 3 near a seam 27 that experiences relatively high stress during deployment. The HSAB cushion 3 may also include additional supports, which may be located anywhere on the airbag cushion. For example, also shown in FIG. 2, the HSAB cushion 3 further includes a second support 105, a third support 205, and a fourth support 305, where the second, third, and fourth supports 105, 205, 305 are located proximate to an inlet region 36 of the cushion 3 where the inflation gas enters the inflatable chamber of the cushion 3 from the inflator (not shown). The inlet region 36 experiences relatively high stress from the generation of the inflation gas from the inflator. Accordingly, the second, third, and fourth supports 105, 205, 305 may be configured proximate to the inlet region 36 to locally increase the strength to accommodate the relative high stresses of the inlet region 36. It should be noted that the airbag cushion may include any number of supports, which may be located anywhere on the cushion, and the examples disclosed herein are not limiting.

Figure 5:
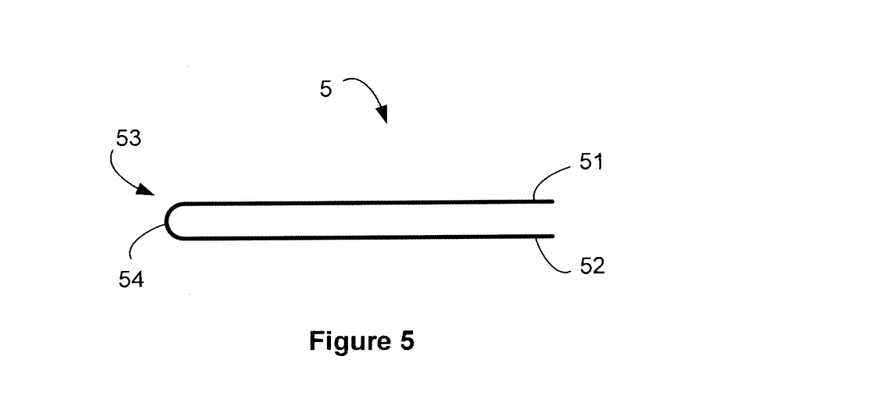
FIG. 5 is a cross-sectional view of an exemplary embodiment of a support for use in the airbag cushion of FIG. 3.

FIG. 5 illustrates an exemplary embodiment of a support 5 that is configured to be used with an airbag cushion, such as the head-side airbag cushion 3 of FIG. 3. The support 5 may have any suitable configuration and may be made of any suitable material, such as a woven nylon fabric or polyester fabric. The support 5 may be configured as an elongated and generally rectangular-shaped panel having a first end 51 and a second end 52. The support 5 may have any suitable length, such as, for example, ranging from 50 mm to 100 mm, and may have any suitable width, such as, for example, ranging from 25 mm to 100 mm. It should be noted that the dimensions are examples and are not limiting, as the support may have any suitable size to accommodate any sized airbag cushion.

The support 5 may be reconfigured or manipulated for assembly with the airbag cushion 3. For example, the support 5 may be folded through a center portion 53, such as folded in half, to define a fold 54 provided between the first and second ends 51, 52 with the first end 51 being provided adjacent to the second end 52 and with the fold 54 extending or pointing in a direction away from the ends, as shown in FIG. 5. In other words, the support 5 may have a single fold arrangement that forms a generally U-shaped cross-section with both ends 51, 52 facing in generally the same direction and the fold 54 facing in an opposing direction. It should be noted that the support may be manipulated for assembly through any suitable process, such as by having more than one fold, by having one or more rolls, or by having a combination thereof.

Figure 7:
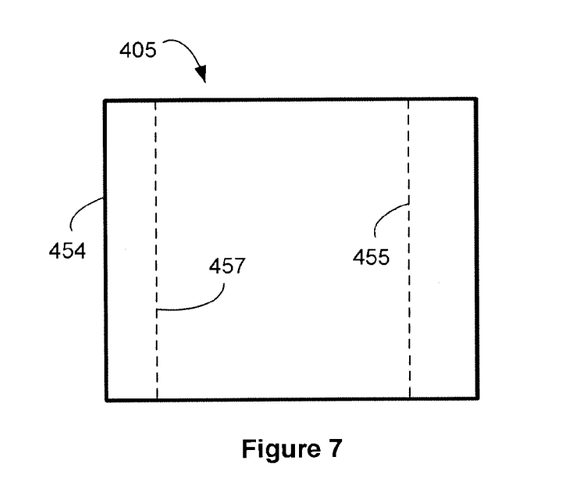
FIG. 7 is a top view of another exemplary embodiment of a support for use in the airbag cushion of FIG. 6.

The support may also include a stitch. As shown in FIGS. 6 and 7, the support 405 may include a first tear stitch 455 that is located near the first and second ends 451, 452 of the support 405 to hold the ends 451, 452 together, such as to improve the assembly of the airbag cushion 403. The support 405 may also include additional stitches. As shown, the support 405 includes a second tear stitch 457 that is located away from the first and second ends 451, 452 and near a center portion 453 of the support 405 to hold the regions of the support 405 adjacent to the center portion 453 together, such as to improve assembly of the airbag cushion 403. The tear stitches 455, 457 may be configured to tear or break under a relatively low loading (e.g., tension), such as by using a relatively light thread (e.g., small denier), in order to help retain the configuration of the support 405 during assembly, but not to impede deployment of the airbag cushion 403. The support 405 and cushion 403 are arranged so that now sewing or stitching is used to prevent separation of the support 405 from the cushion 403. Furthermore, no stitching or sewing is used to prevent lengthening or deformation of the support 405. For example, the support 405 does not include stitching that prevents separation of the support itself into two separate and distinct parts.

The support 5, 405 may be coupled to the airbag cushion 3, 403 at locations that correspond to high stress regions or reduced strength regions to improve the strength of the cushion local to the location of the support 5, 405. For example, the support 5, 405 may be coupled to the airbag cushion 3, 403 near to a seam 27, 427, wherein the support 5, 405 strengthens the region local to the seam, such that the region is able to withstand the relatively high stresses induced during deployment.

As shown in FIGS. 3 and 4, the support 5 is coupled to the first panel 31 and the second panel 32 proximate to the location of the seam 27 of the airbag cushion 3. The support 5 is disposed between the first panel 31 and the second panel 32 with the first end 51 of the support 5 being coupled to the first panel 31 and the second end 52 of the support 5 being coupled to the second panel 32. The first end 51 of the support 5 may be coupled to the inner surface of the first panel 31 at a first joint 61 (or first connection) through any suitable method, such as through an adhesive or structural sealant. The second end 52 of the support 5 may be coupled to the inner surface of the second panel 32 at a second joint 62 (or second connection) through any suitable method, such as through an adhesive or structural sealant.

The support 5 may be coupled to the first and second panels 31, 32, such that the center portion 53 of the support 5 faces toward the seam 27 and the ends 51, 52 face away from the seam 27 and inward toward an inflatable chamber 33 of the airbag cushion 3. In other words, the support 5 having the single fold arrangement may be positioned or disposed between the panels 31, 32 of the airbag cushion 3 with the fold 54 of the support 5 pointing toward the seam 27 and the with ends 51, 52 extending into the inflatable chamber 33. The fold 54 may extend a direction substantially parallel to the seam 27. Depending on the direction of the seam 27, the relationship between the seam 27 and the fold 54 may vary. For example, as shown in FIG. 2, the support 5 may be positioned adjacent to a curved seam 27. In such an arrangement, the fold 54 may essential be parallel to a tangent to the seam 27. Thus, the support 5 may cooperate with the first and second panels 31, 32 to define the inflatable chamber 33. The fold 54 and the center portion 53 of the support 5 may be provided adjacent to or proximate to the seam 27, or may be spaced apart from the seam 27.

The support (e.g., the support 5) may be assembled to the airbag cushion (e.g., airbag cushion 3) using a manual process, an automated process, or a combination thereof. For example, the support 5 may be placed into the proper location using a robotic arm, such as a robotic arm having pick and place capability, where each support 5 may be located accurately in a high stress location 35. The four supports 5, 105, 205, 305 shown in FIG. 2 may be assembled to the high stress locations 35a-35d using an automated robotic arm to ensure repeatable placement of each support 5, 105, 205, 305 relative to a corresponding high stress location 35a-35d of the airbag cushion 3.

During deployment of the airbag cushion 3, the first panel 31 and second panel 32 separate due to the rising internal pressures caused by the inflation gas filling and expanding the cushion 3. The separation of the panels 31, 32 induce shear stresses into the first and second joints 61, 62. The joints 61, 62 using adhesive and/or structural sealant to couple the panels 31, 32 and support 5 may be relatively stronger (e.g., by up to three times stronger) than joints, such as stitched joints, that are loaded under a peeling condition. Additionally, the seam 27 between the panels 31, 32 is subjected to peel stresses during airbag deployment, but the peel stresses are significantly reduced due to the loading that the joints 61, 62 under.

Accordingly, the relatively stronger joints 61, 62 in effect act to shield or protect the relatively weaker seam 27 by absorbing loads that otherwise would pass directly to the seam 27 without the joints 61, 62. It is noted that by placing the folded support 5 between the seam 27 and the inflatable chamber 33, during airbag deployment, the support 5 may be pulled apart in tension by loads induced through the inflation of the inflatable chamber 33. The panels 31, 32 of the airbag cushion 3 transmit the loads (from deployment) to the joints 61, 62, such as the adhesives coupling at the joints, such that the joints 61, 62 and adhesives may be subjected to shear loading. The joints 61, 62, such as the adhesives at the joints, may be configured, such as having a thickness, that is able to withstand the shear stresses. This arrangement may advantageously allow the overall weight of the airbag cushion 3 to be reduced by allowing relatively lower weight panels (e.g., panels 31, 32) that are configured to manage a threshold loading (e.g., a relative low loading) and by having support(s) (e.g., the support 5, 105, 205, 305) that are configured to be located in positions of high stress to increase the strength of the cushion 3 local to the support(s) with relatively low additional weight.

The second, third, and fourth supports 105, 205, 305 may be configured the same as, similar to, or differently from the support 5. For example, each support 105, 205, 305 may be configured differently than support 5, such as having a size that tailors the strength of the respective support to the level of stress that the respective portion of the airbag cushion 3 is subjected to during deployment. Further, the airbag cushion may include any number of supports, which may be located anywhere on the cushion, and the examples disclosed herein are not limiting.

Figure 8:
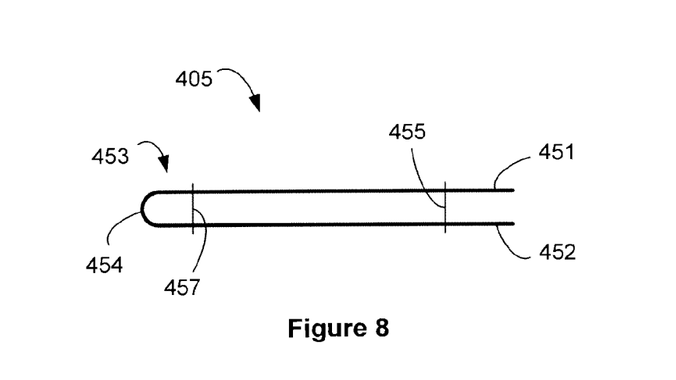
FIG. 8 is a side view of the support of FIG. 6.

The support may be coupled to each panel of the airbag cushion at more than one location, such as through more than connection or joint. As shown in FIG. 8, the support 405 is coupled to the airbag cushion 403 at four joints 461, 462, 463, 464 (e.g., four connections). The support 405 is disposed between the first panel 431 and the second panel 432 of the airbag cushion 403 having a folded arrangement. The first joint 461 is on a first portion (e.g., first side) of the support 405 near the first end 451 of the support 405 and couples the support 405 to the first panel 431 of the airbag cushion 403. The third joint 463 is also on the first portion of the support 405 located between the first joint 461 and the seam 427. The second joint 462 is on a second portion (e.g., second side) of the support 405 near the second end 452 of the support 405 and couples the support 405 to the second panel 432 of the airbag cushion 403. The fourth joint 464 is also on the second portion of the support 405 located between the second joint 462 and the seam 427. Each of the joints 461, 462, 463, 464 may couple the support 405 to the airbag cushion 403 through any suitable method, such as through an adhesive or structural sealant. Thus, the support 405 may be coupled to the first and second panels 431, 432, such that the center portion 453 of the support 405 faces toward the seam 427 and the ends 451, 452 face inward toward the inflatable chamber 433 of the airbag cushion 403.

During deployment of the airbag cushion 403, the seam 427 may be shielded from loading by two joints 461, 463 between the support 405 and the first panel 431 of the airbag cushion 403 and by two joints 462, 464 between the support 405 and the second panel 432. Thus, the plurality of joints 461, 462, 463, 464 may further improve the strength of the airbag cushion 403 local to the support 405 to tailor the strength of the region to withstand the respective local stresses. Further, the plurality of joints 461, 462, 463, 464 may have similar strengths or different strengths.

The HSAB cushion may also include a sealant to prohibit or reduce the likelihood of leakage of the inflation gas from the inflatable airbag cushion during deployment. For example, the airbag cushion may have sealant applied to the seam 27 to prohibit the inflation gas from leaking through the seam 27 during deployment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module, comprising:
   an inflatable airbag cushion having a first panel and a second panel interconnected by a seam around peripheries thereof to form an inlet and an inflatable chamber;
   an inflator for inflating the airbag cushion; and
   a support having a first end and a second end;
   wherein the first end is coupled to the first panel at a first joint without the use of stitching and the second end is coupled to the second panel at a second joint without the use of stitching;
   wherein the first and second joints are provided between the seam and an inflatable chamber formed by the first and second panels;
   wherein the inlet is configured to receive inflation gas directly from the inflator and to communicate the inflation gas into the inflatable chamber; and
   wherein the support is positioned adjacent a portion of the seam where the inlet transitions from the inlet to the inflatable chamber.

2. The airbag module of claim 1, wherein the support includes a fold provided between the first and second ends thereby creating two portions with each of the two portions containing one of the first end and the second end and each of the two portions being located on a side of the fold.

3. The airbag module of claim 2, wherein, prior to inflation and deployment of the airbag, the first end of the support is positioned adjacent to the second end of the support.

4. The airbag module of claim 3, wherein the fold extends parallel to the seam.

5. The airbag module of claim 2, wherein the support further includes a stitch located between the fold and the ends of the support, wherein the stitch is configured to stitch the two portions of the support together.

6. The airbag module of claim 1, wherein the first panel is coupled to the first end of the support using an adhesive or structural sealant, and the second panel is coupled to the second end of the support using an adhesive or structural sealant.

7. The airbag module of claim 1, wherein the support is located near the inflator and acts as a heat shield to protect the seam from inflation gas during airbag deployment.

8. The airbag module of claim 1, wherein the support is coupled to the first panel at a third joint located between the first joint and the seam, and wherein the support is coupled to the second panel at a fourth joint located between the second joint and the seam.

9. The airbag module of claim 1, wherein the support is positioned adjacent a portion of the seam that forms a corner where the inlet widens into the inflatable chamber.

10. The airbag module of claim 1, further comprising a second support;
   wherein the second support has a first end and a second end;
   wherein the first end of the second support is coupled to the first panel at a third joint without the use of stitching, and the second end of the second support is coupled to the second panel at a fourth joint without the use of stitching;
   wherein the third and fourth joints are provided between the seam and the inflatable chamber formed by the first and second panels;
   wherein the second support is positioned adjacent a portion of the seam where the inlet transitions from the inlet to the inflatable chamber and is positioned generally on an opposite side of the inlet from where the first support is positioned.

11. The airbag module of claim 10, wherein the first support is positioned adjacent a first portion of the seam that forms a first corner where the inlet widens into the inflatable chamber, and the second support is positioned adjacent a second portion of the seam that forms a second corner whether the inlet widens into the inflatable chamber, the second corner being positioned generally opposite to the first corner across the inlet.

12. The airbag module of claim 1, wherein the support extends a distance no longer than 100 mm along the portion of the seam.

13. An airbag module, comprising:
   an inflatable airbag cushion having a first panel and a second panel interconnected by a seam;
   an inflator for inflating the airbag cushion; and
   a support having a first end and a second end;
   wherein the first end is coupled to the first panel at a first joint without the use of stitching and the second end is coupled to the second panel at a second joint without the use of stitching;
   wherein the first and second joints are provided between the seam and an inflatable chamber formed by the first and second panels;
   wherein the support includes a fold provided between the first and second ends thereby creating two portions with each of the two portions containing one of the first end and the second end and each of the two portions being located on a side of the fold;
   wherein the support further includes a stitch located between the fold and the ends of the support, wherein the stitch is configured to stitch the two portions of the support together; and
   wherein the stitch is a tear stitch that is configured to tear under relatively low loading and generally not impede deployment of the airbag.

14. An airbag module, comprising:
   an inflatable airbag cushion having a first panel and a second panel interconnected by a seam;
   an inflator for inflating the airbag cushion; and
   a support having a first end and a second end;
   wherein the first end is coupled to the first panel at a first joint without the use of stitching and the second end is coupled to the second panel at a second joint without the use of stitching;
   wherein the first and second joints are provided between the seam and an inflatable chamber formed by the first and second panels; and
   wherein the support is coupled to the first panel at a third joint located between the first joint and the seam, and wherein the support is coupled to the second panel at a fourth joint located between the second joint and the seam.

15. The airbag module of claim 14, wherein the support is a single, unitary member, and a first portion of the support is coupled to a second portion of the support with a stitch.

16. The airbag module of claim 15, wherein the support includes a fold, and the stitch is positioned further away from the fold than all of the first, second, third, and fourth joints.

17. The airbag module of claim 15, wherein the support includes a fold, and the stitch is positioned between the fold and at least one of the first, second, third, and fourth joints.

18. An inflatable airbag cushion for use in an airbag module, the airbag cushion comprising:
   at least two panels that includes a first panel and a second panel coupled together at a seam; and
   a support having a first end and a second end;

wherein the first end is coupled to the first panel at a first joint without the use of stitching and the second end is coupled to the second panel at a second joint without the use of stitching;

wherein the first and second joints are provided between the seam and an inflatable chamber formed by the first and second panels; and     wherein a first portion of the support is coupled to a second portion of the support with a tear stitch, the tear stitch configured to allow the first and second portions of the support to separate from each other during inflation of the airbag cushion.

19. The airbag module of claim 18, wherein the first panel is coupled to the first end of the support using an adhesive or structural sealant, and the second panel is coupled to the second end of the support using an adhesive or structural sealant.

20. The airbag cushion of claim 18, wherein the support includes a fold provided between the first and second ends.

21. The airbag module of claim 20, wherein the tear stitch is positioned further away from the fold than at least one of the first and second joints.

22. The airbag cushion of claim 20, wherein the first end is configured adjacent to the second end and the fold is configured to extend in a direction opposing the first and second ends.

23. The airbag cushion of claim 22, wherein the fold extends parallel to the seam.

24. The airbag cushion of claim 23, wherein the tear stitch is located between the fold and the ends.

25. The airbag module of claim 24, wherein the tear stitch that is configured to tear under relatively low loading.

\* \* \* \* \*